United States Patent
Kwon

(10) Patent No.: US 10,627,954 B2
(45) Date of Patent: Apr. 21, 2020

(54) DRIVING CIRCUIT FOR A TOUCH PANEL REALIZING MODES USING A SENSING CIRCUIT AND TOUCH SENSING METHOD USING THE SAME

(71) Applicant: IUCF-HYU (INDUSTRY-UNIVERSITY COOPERATION FOUNDATION HANYANG UNIVERSITY), Seoul (KR)

(72) Inventor: Oh Kyong Kwon, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 44 days.

(21) Appl. No.: 15/780,488

(22) PCT Filed: Dec. 23, 2016

(86) PCT No.: PCT/KR2016/015201
§ 371 (c)(1),
(2) Date: May 31, 2018

(87) PCT Pub. No.: WO2017/116082
PCT Pub. Date: Jul. 6, 2017

(65) Prior Publication Data
US 2018/0364855 A1    Dec. 20, 2018

(30) Foreign Application Priority Data
Dec. 28, 2015  (KR) .................... 10-2015-0187180

(51) Int. Cl.
G06F 3/041    (2006.01)
G06F 3/044    (2006.01)

(52) U.S. Cl.
CPC ........ *G06F 3/041662* (2019.05); *G06F 3/041* (2013.01); *G06F 3/044* (2013.01)

(58) Field of Classification Search
CPC ... G06F 3/0416; G06F 3/044; G06F 3/041662
See application file for complete search history.

(56) References Cited

U.S. PATENT DOCUMENTS

2010/0328262 A1* 12/2010 Huang .................. G06F 3/0416
                                                    345/174

FOREIGN PATENT DOCUMENTS

KR    10-2012-0078073 A    7/2012
KR    10-2012-0085737 A    8/2012
(Continued)

OTHER PUBLICATIONS

English (machine) translation of KR-10-2012-0078073 (see IDS filed May 31, 2018, foreign patent reference #1) (Year: 2012).*
(Continued)

*Primary Examiner* — Laurence J Lee
(74) *Attorney, Agent, or Firm* — Sughrue Mion, PLLC

(57) ABSTRACT

A driving circuit for a touch panel is disclosed. The driving circuit switches between a mutual capacitance sensing mode and a self capacitance sensing mode using the same sensing circuit. As such, the driving circuit for a touch panel implements a hybrid touch panel that is capable of sensing a touch in either a mutual capacitance sensing mode or a self capacitance sensing mode without requiring a complex and large driving circuit for separate sensing circuits for each mode.

13 Claims, 4 Drawing Sheets

(56) References Cited

FOREIGN PATENT DOCUMENTS

| KR | 10-2012-0086811 A | 8/2012 |
|---|---|---|
| KR | 10-2015-0108003 A | 9/2015 |
| WO | 2011/014580 A1 | 2/2011 |
| WO | 2013/066528 A1 | 5/2013 |

OTHER PUBLICATIONS

Office Action of KR 10-2015-0187180 dated Nov. 21, 2016.
Notice of Allowance for KR 10-2015-0187180 dated Apr. 20, 2017.
International Search Report of PCT/Kr/2016015201 dated Mar. 28, 2017.

* cited by examiner

DRIVING CIRCUIT FOR A TOUCH PANEL REALIZING MODES USING A SENSING CIRCUIT AND TOUCH SENSING METHOD USING THE SAME

PRIORITY

This application claims priority under 35 U.S.C. § 119(a) to a Korean patent application filed on Dec. 28, 2015 in the Korean Intellectual Property Office and assigned Serial No. 10-2015-0187180 and a PCT application PCT/KR2016/015201 filed on Dec. 23, 2016, the entire disclosure of which is incorporated herein by reference.

BACKGROUND

1. Field of the Invention

The invention relates to a driving circuit for a touch panel capable of operating selectively a mutual capacitance sensing mode or a self conductance sensing mode using one sensing circuit and a touch sensing method using the same.

2. Description of the Related Art

A method of sensing touch of a touch panel includes a mutual capacitance sensing method and a self capacitance sensing method.

A conventional driving circuit of a touch panel uses only one of the mutual capacitance sensing method and the self capacitance sensing mode. If the touch panel uses a mutual capacitance sensing mode and a self capacitance sensing mode, the driving circuit must include individually a sensing circuit for the mutual capacitance sensing mode and a sensing circuit for the self capacitance sensing mode. As a result, a size of the driving circuit is increased, and the driving circuit becomes complicated.

SUMMARY

The invention provides a driving circuit of a touch panel capable of operating selectively a mutual capacitance sensing mode or a self capacitance sensing mode using one sensing circuit and a touch sensing method using the same.

According to one embodiment of the invention, a driving circuit for a touch panel includes a mode selection operating unit configured to perform selectively a mutual capacitance sensing mode and a self capacitance sensing mode through a switching operation; and a conversion unit connected to the mode selection operating unit. Here, the mode selection operating unit senses change of capacitance in response to touch of the touch panel in a selected mode, and the conversion unit converts the changed capacitance to touch data.

According to one embodiment of the invention, a sensing circuit used in a driving circuit for a touch panel includes a first path unit configured to sense change of capacitance in response to touch of the touch panel in a mutual capacitance sensing mode; and a second path unit configured to sense change of capacitance in response to the touch of the touch panel in a self capacitance sensing mode. Here, the mutual capacitance sensing mode and the self capacitance sensing mode operate selectively, and both of the first path unit and the second path unit are used in the mutual capacitance sensing mode or the self capacitance sensing mode.

According to another embodiment of the invention, a sensing circuit used in a driving circuit for a touch panel includes a first path unit configured to include a first capacitor having capacitance changed in response to touch of the touch panel and a second capacitor corresponding to an electrode for touch sensing; and a second path unit configured to include a third capacitor. Here, the third capacitor has capacitance for cancelling at least partial of capacitance of the second capacitor.

According to one embodiment of the invention, a method of sensing touch of a touch panel comprising a first path unit including a capacitor having capacitance changed in response to touch of the touch panel, a second path unit including a variable capacitor, a first switch connected between the first path unit and a conversion unit and a second switch connected between the second path unit and the conversion unit, the method comprising: charging a first node between the capacitor and the first switch and a second node between the variable capacitor and the second switch; sharing charges of the first node and the second node so that the first node and the second node have the same voltage; and sensing the change of the capacitance in response to the touch of the touch panel while the nodes have the same voltage. Here, an interval for the charging and an interval for the sharing are not overlapped.

A driving circuit for a touch panel and a touch sensing method of the invention may operate selectively a mutual capacitance sensing mode and a self capacitance sensing mode using one sensing circuit. Accordingly, a size and a complexity of the driving circuit may reduce, and thus usage effect of the touch panel may be enhanced.

Additionally, since the driving circuit cancels capacitance corresponding to an electrode for touch sensing by using a variable capacitor, the driving circuit may be usefully employed in a large touch panel.

BRIEF DESCRIPTION OF DRAWINGS

The aspects, features, advantages and embodiments of the invention will be more apparent from the following detailed description taken in conjunction with reference to the accompanying drawings, in which.

DETAILED DESCRIPTION

In the present specification, an expression used in the singular encompasses the expression of the plural, unless it has a clearly different meaning in the context. In the present specification, terms such as "comprising" or "including," etc., should not be interpreted as meaning that all of the elements or operations are necessarily included. That is, some of the elements or operations may not be included, while other additional elements or operations may be further included. Also, terms such as "unit," "module," etc., as used in the present specification may refer to a part for processing at least one function or action and may be implemented as hardware, software, or a combination of hardware and software.

The invention relates to a driving circuit for a capacitive touch panel, specially a sensing circuit. The driving circuit may realize both of a mutual capacitance sensing mode and a self capacitance sensing mode using one sensing circuit. Here, the mutual capacitance sensing mode and the self capacitance sensing mode are not simultaneously operated but are selectively operated.

The mutual capacitance sensing mode has relatively low touch sensitivity but may realize multi touch. The self capacitance sensing mode can't realize multi touch and has relatively high touch sensitivity. Accordingly, a user using the touch panel including the driving circuit of the invention may use selectively the mutual capacitance sensing mode or the self capacitance sensing mode according to his desired object.

Conventional driving circuit includes generally only one of a sensing circuit for sensing touch through a mutual capacitance sensing method and a sensing circuit for sensing touch through a self capacitance sensing method. If the touch panel operates a mutual capacitance sensing mode and a self capacitance sensing mode, the driving circuit must include individually the sensing circuit for sensing touch through the mutual capacitance sensing method and the sensing circuit for sensing touch through the self capacitance sensing method. As a result, a size and a complexity of the driving circuit and are increased.

The driving circuit of the invention may realize both of the mutual capacitance sensing mode and the self capacitance sensing mode using one sensing circuit. Accordingly, the touch panel may reduce a size and complexity of the driving circuit with realizing the mutual capacitance sensing mode and the self capacitance sensing mode. Furthermore, the driving circuit may secure sensing efficiency of touch coordinate because it can use selectively the mutual capacitance sensing mode and the self capacitance sensing mode.

Unlike conventional technique where touch coordinate can't detected in a large touch panel, the driving circuit of the invention may detect accurately touch coordinate in the large touch panel.

Hereinafter, embodiments of the invention will be described in detail with reference to accompanying drawings.

Figure 1:
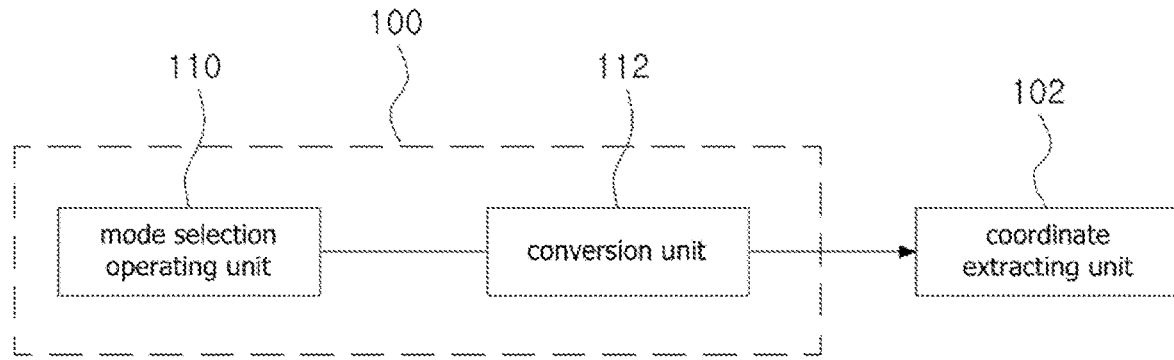
FIG. 1 is a block diagram illustrating schematically a driving circuit for a touch panel according to one embodiment of the invention.

FIG. 1 is a block diagram illustrating schematically a driving circuit for a touch panel according to one embodiment of the invention. FIG. 1 shows only elements used for detecting touch coordinate of the driving circuit in FIG. 1.

In FIG. 1, the driving circuit of the touch panel of the present embodiment may be employed in a capacitive touch panel, and it includes a sensing circuit 100 and a coordinate extracting unit 102.

The touch panel is generally classified into a resistive type touch panel and the capacitive touch panel. The capacitive touch panel detects change of capacitance between a detection plate and a touch means when the touch means comes close or touches a sensing electrode, and senses touch according to the detection. The driving circuit of the invention may be applied to the capacitive touch panel.

The sensing circuit 100 senses the touch means such as a finger, a touch pen, etc., and includes a mode selection operating unit 110 and a conversion unit 112.

The mode selection operating unit 110 senses touch of the touch means in various modes, and preferably may perform a touch sensing operation by using any one of the mutual capacitance sensing mode and the self capacitance sensing mode.

The mutual capacitance sensing mode and the self capacitance sensing mode may be automatically selected according to setting, or be selected according to user's command.

Referring to a method of sensing touch coordinate in the mutual capacitance sensing mode, parasitic capacitance between a transmitter electrode and a receiver electrode is changed when the touch means touches the touch panel. In this case, the sensing circuit senses touch by detecting current flowing from the transmitter electrode to the receiver electrode. The touch sensing method includes a scan driving method and a parallel driving method.

In the scan driving method, when a signal is transmitted to one transmitter electrode, the other transmitter electrodes are grounded, and current generated by parasitic capacitance is simultaneously detected through whole of transmitter electrodes.

Multi touch may be completely sensed because the signal provided from the transmitter electrode is simultaneously read through whole of receiver electrodes. Since signals are sequentially provided through a scanning method, the sensing circuit in the mutual capacitance sensing mode senses touch of the touch panel in scanning by reading data in a unit of a line. (scanning driving method)

Referring to the method of sensing touch coordinate in the self capacitance sensing mode, capacitance of corresponding electrode is changed through an insulating layer when the touch means touches the touch panel, and then the touch is sensed by detecting current corresponding to the changed capacitance. The current is detected by a transmitter terminal, unlike the mutual capacitance sensing mode where a receiver terminal reads current.

That is, the mode selection operating unit 110 may operate selectively the mutual capacitance sensing mode and the self capacitance sensing mode which drive differently. Fields in which the mutual capacitance sensing mode and the self capacitance sensing mode are usefully employed differ, and thus the driving circuit of the invention is efficient because the driving circuit can use selectively proper mode depending on situation. Of course, the driving circuit may not drive simultaneously the mutual capacitance sensing mode and the self capacitance sensing mode, but may perform sequentially the mutual capacitance sensing mode and the self capacitance sensing mode.

In one embodiment, the mode selection operating unit 110 may share a specific path for the mutual capacitance sensing mode and the self capacitance sensing mode as described below.

In another embodiment, the mode selection operating unit 110 may use extra capacitance which can cancel capacitance of a transmitter electrode or a receiver electrode so that the driving circuit is applicable to a large touch panel as described below.

The conversion unit 112 converts change of capacitance sensed by the mode selection sensing mode 110 into touch data. For example, the conversion unit 112 converts the sensed capacitance to the touch data in the mutual capacitance sensing mode.

The coordinate extracting unit 102 extracts coordinate of touch point (touch coordinate) by a touch meaning through analysis of the touch data outputted from the conversion unit 112.

Briefly, the driving circuit for the touch panel according to the present embodiment may realize the mutual capacitance sensing mode and the self capacitance sensing mode by using one sensing circuit.

Figure 2:
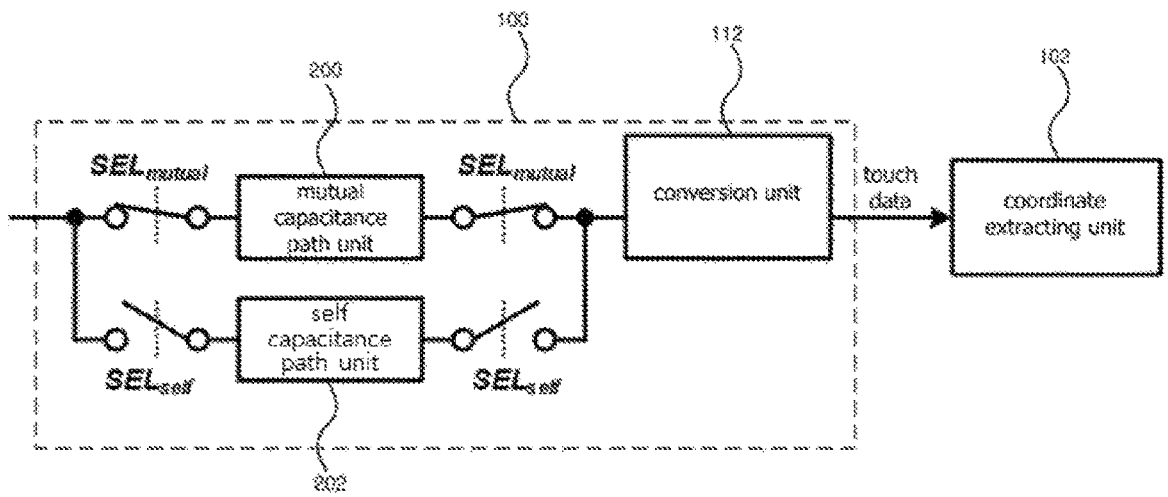
FIG. 2 is a view illustrating schematically a driving circuit for the touch panel according to a first embodiment of the invention.

FIG. 2 is a view illustrating schematically a driving circuit for the touch panel according to a first embodiment of the invention.

In FIG. 2, the mode selection operating unit 110 of the driving circuit includes a mutual capacitance path unit 200, a self capacitance path unit 202 and switches SELmutual and SELself.

In the mutual capacitance sensing mode, the switches SELmutual are turned on and the switches SELself are off. As a result, the mutual capacitance path unit 200 may sense change of capacitance in response to touch when the touch means touches the touch panel.

In the self capacitance sensing mode, the switches SELself are tuned on and the switches SELmutual are off. As a result, the self capacitance path unit 202 may sense change of capacitance in response to touch when the touch means touches the touch panel.

The conversion unit 112 converts the sensed capacitance according to the mode into touch data, and transmits the touch data to the coordinate extracting unit 102.

Shortly, the mode selection operating unit 110 may select a desired path through switching of the switches according to the mode, and sense capacitance in response to the touch of the touch means via the selected path. Here, a mutual capacitance sensing path and a self capacitance sensing path exist individually.

Figure 3:
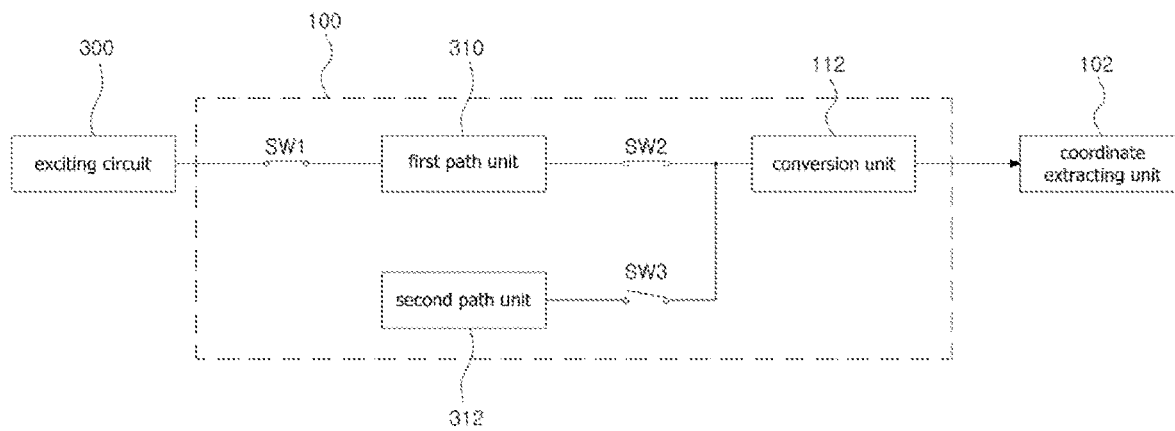
FIG. 3 is a view illustrating schematically a driving circuit for a touch panel according to a second embodiment of the invention.

FIG. 3 is a view illustrating schematically a driving circuit for a touch panel according to a second embodiment of the invention.

The mode selection operating unit 110 of the driving circuit for the touch panel according to the present embodiment includes a first path unit 310, a second path unit 312 and switches SW1 to SW3. Here, the first path unit 310 may be connected to an excitation circuit 300 through the switch SW1, or be connected to the excitation circuit 300 without the switch SW1. The excitation circuit 300 provides an excitation signal (e.g. pulse) to the first path unit 310.

In one embodiment, in a first mode, e.g. mutual capacitance sensing mode, the switches SW1 and SW2 are turned on, and the switch SW3 is off. As a result, the first path unit 310 is connected to the excitation unit 300 and the conversion unit 112. The first path unit 310 senses capacitance changed in response to the excitation signal transmitted from the excitation circuit 300 when the touch means touches the touch panel.

In a second mode, e.g. self capacitance sensing mode, the switches SW1 to SW3 are turned on. Here, capacitance of the second path unit 312 may be set to be equal to that of a transmitter electrode or a receiver electrode of the first path unit 310. As a result, the capacitance of the transmitter electrode or the receiver electrode is canceled by the capacitance of the second path unit 312. The mode selection operating unit 110 senses capacitance changed in response to the touch of the touch means.

The circuit of the mode selection operating unit 110 is proper to sense touch of a large touch panel.

If the capacitance is not canceled, change ratio of the capacitance in response to the touch of the touch means is relatively small due to the capacitance of the transmitter electrode or the receiver electrode. Accordingly, in case of the large touch panel in which the capacitance of the transmitter electrode or the receiver electrode is very high, the mode selection operating unit 110 may not sense change of the capacitance in response to the touch of the touch means.

The mode selection operating unit 110 of the present embodiment cancels the capacitance of the transmitter electrode or the receiver electrode with the capacitance of the second path unit 312, and thus change ratio of the capacitance in response to the touch of the touch means is relatively high compared to a circuit where the capacitance is not canceled. As a result, the mode selection operating unit 110 may detect more sensitively the change of the capacitance compared to the circuit where the capacitance is not canceled, and so it is applicable to the large touch panel in which the capacitance of the transmitter electrode or the receiver electrode is very high.

In brief, the mode selection operating unit 110 of the present embodiment may share a specific path (for example, a path corresponding to the first path unit) in a specific mode, e.g. self capacitance sensing mode, and specially cancel the capacitance of the transmitter electrode or the receiver electrode through the sharing of the path so that it is can be employed in the large touch panel.

Hereinafter, a touch sensing operation in the mutual capacitance sensing mode and a touch sensing operation in the self capacitance sensing mode will be described in detail with reference to accompanying drawings.

Firstly, the touch sensing operation in the mutual capacitance sensing mode will be described.

Figure 4:
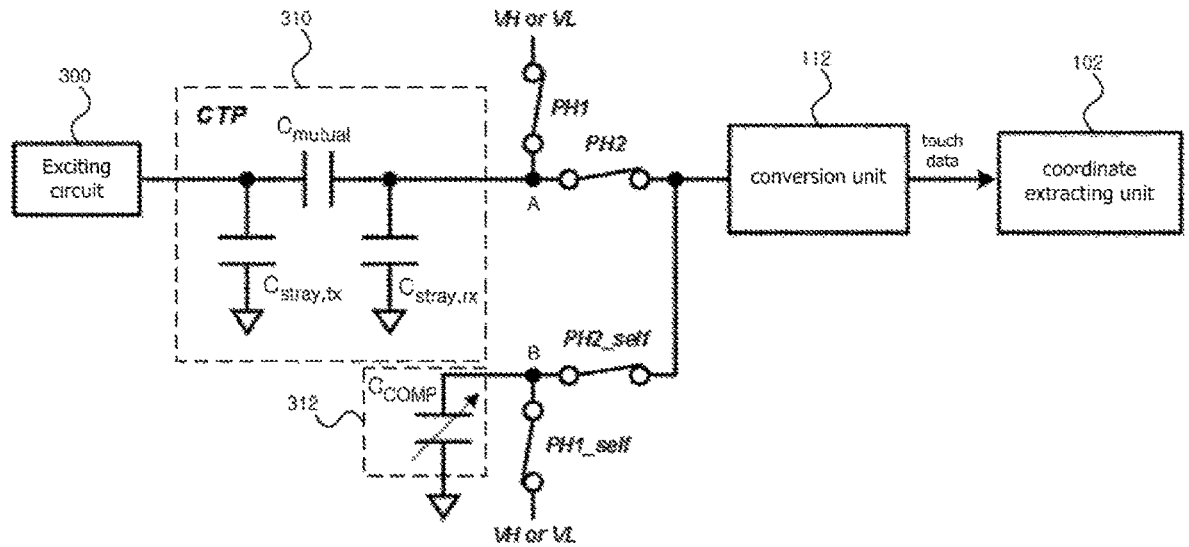
FIG. 4 is a view illustrating a circuit for operation of a driving circuit according to one embodiment of the invention.

FIG. 4 is a view illustrating a circuit for operation of a driving circuit according to one embodiment of the invention. Particularly, FIG. 4 shows operation of the driving circuit in the mutual capacitance sensing mode.

In FIG. 4, the first path unit 310 includes a capacitor Cmutual changed in response to touch of the touch panel, a capacitance Cstray,tx for the transmitter electrode and a capacitance Cstray,rx for the receiver electrode. The second path unit 312 may include a variable capacitor Ccomp.

One terminal of the capacitor Cmutual is connected to the excitation circuit 300, and the other terminal of the capacitor Cmutual is connected to a power source VH or VL through a switch PH1, or is connected to the conversion unit 112 through a switch PH2.

In the mutual capacity sensing mode, the switches PH1 and PH2_self are off, and the switch PH2 is turned on. Here, on/off of the switch PH1_self does not matter because the switch PH2_self is off.

In this case, the capacitance of the capacitor Cmutual is changed in response to the excitation signal outputted from the excitation circuit 300 when the touch means touches the touch panel.

The changed capacitance is converted to the touch data by the conversion unit 112, and the coordinate extracting unit 102 extracts touch coordinate by analyzing the touch data.

Next, the touch sensing operation in the self capacitance sensing mode will be described.

FIG. 5 to FIG. 9 are views illustrating operation of a driving circuit in the self capacitance sensing mode according to one embodiment of the invention. The driving circuit for the self capacitance sensing mode is the same as in FIG. 4.

Figure 5:
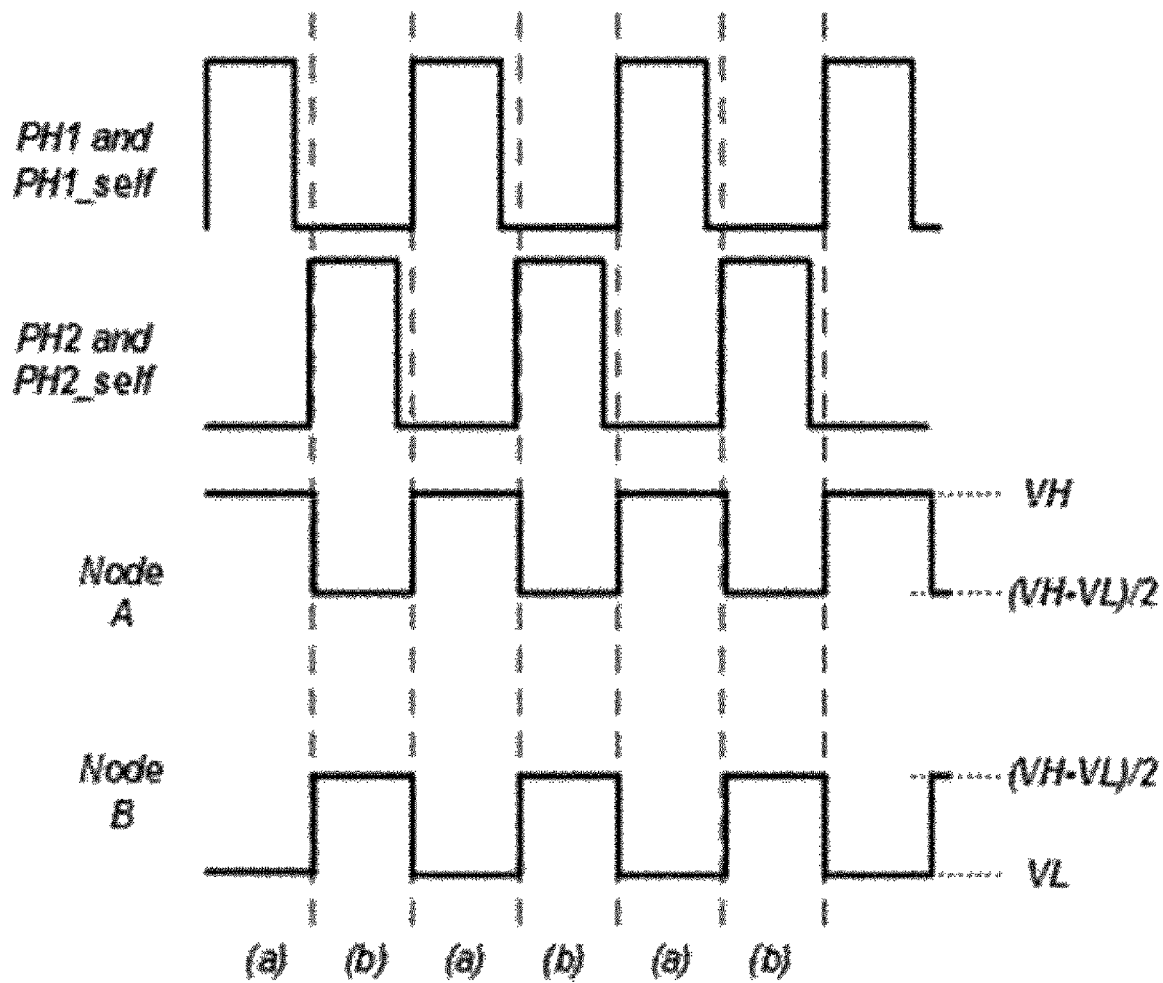
FIG. 5 to FIG. 9 are views illustrating operation of a driving circuit in the self capacitance sensing mode according to one embodiment of the invention.
Figure 6:
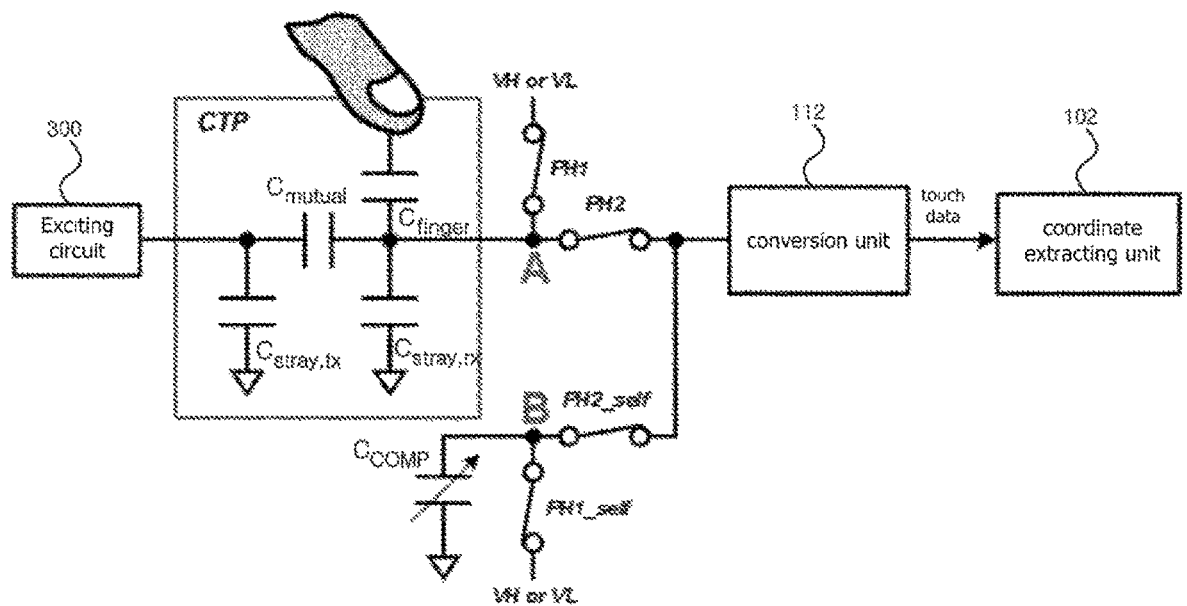
Figure 7:
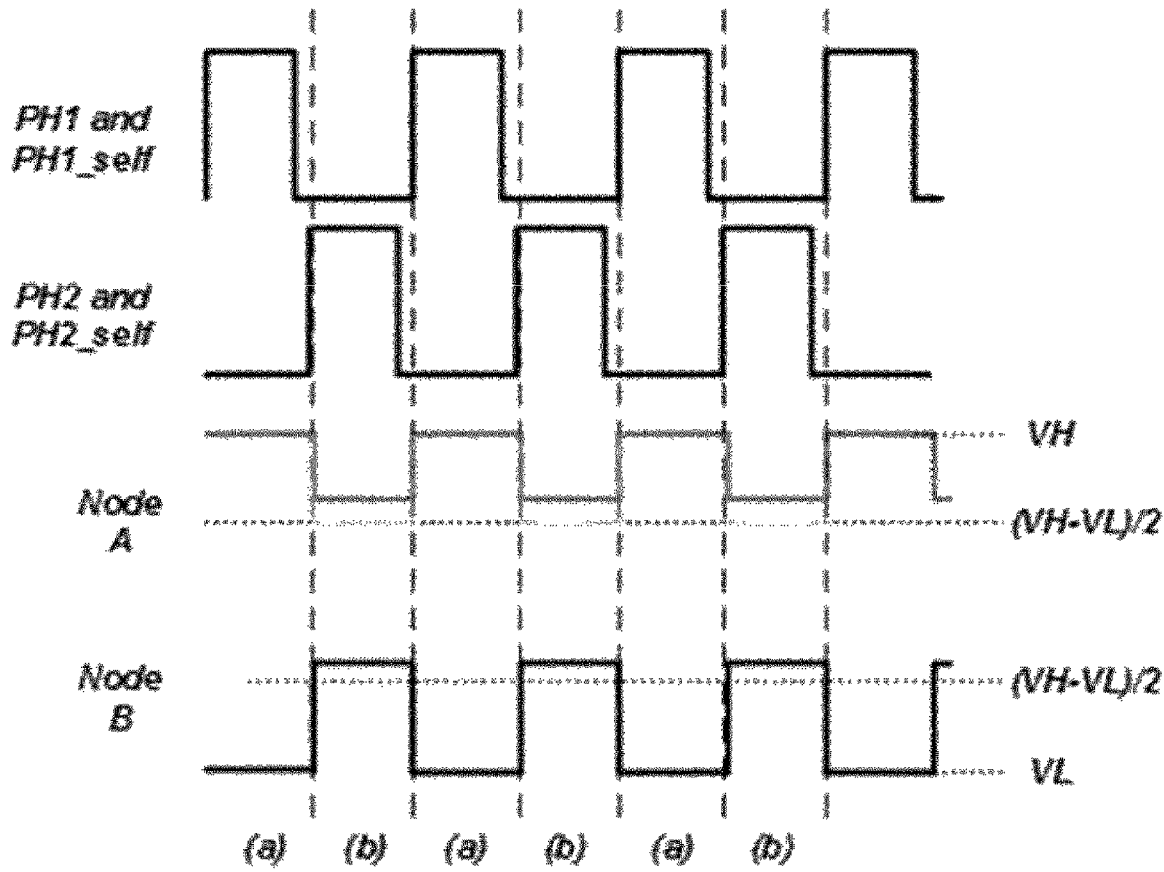

Referring to an operation before touch (precharging operation) for self capacitance sensing through drawings FIG. 4 and FIG. 5, an on interval of the switches PH1 and PH1_self for connection to the power source and an on interval of the switches PH2 and PH2_self for connection to the conversion unit 312 are not overlapped as shown in FIG. 5.

The variable capacitor Ccomp may correspond to the capacitance Cstray,tx for the transmitter electrode or the capacitance Cstray,rx for the receiver electrode, or correspond to sum of the capacitance Cstray,tx and the capacitance Cstray,rx. Preferably, the variable capacitor Ccomp is set to have capacitance corresponding to the electrode when the driving circuit is manufactured. At least partial of the capacitance corresponding to the electrode and the capacitance of the variable capacitor Ccomp is cancelled, and thus the change of the capacitance may be more sensitively detected when the touch means touches and the driving circuit may be usable in the large panel as well as a small panel.

In the detailed operation before the touch, nodes A and B are charged to constant voltage source or current source by the power source VH or VL. Here, the switches PH2 and PH2_self are off.

Subsequently, the switches PH2 and PH2_self are turned on, and the switches PH1 and PH1_self are turned off. As a result, charge sharing is performed between the nodes A and B.

The above steps are repeatedly performed as shown in FIG. 5, and so a voltage of each of the nodes A and B is converged to (VH−VL)/2.

In an operation in accordance with touch after the precharging, the capacitance of the capacitor Cmutual increases by capacitance corresponding to the touch when the touch means touches the touch panel. As a result, a voltage of the node A increases. A voltage of the node B is equal to a voltage before the touch.

Next, since the switches PH2 and PH2_self are on and the switches PH1 and PH1_self are off, a charge sharing operation is performed. Particularly, charges of the nodes A and B are shared. Accordingly, voltages of the nodes A and B are the same, and they increase to a voltage higher than the (VH−VL)/2.

The conversion unit 112 converts sensing result generated by sensing change of capacitance corresponding to the increased voltage to touch data.

The coordinate extracting unit 102 extracts touch coordinate by analyzing the touch data outputted from the conversion unit 112.

In short, the driving circuit of the invention uses together the first path used in the mutual capacitance sensing mode as well as the second path, in the self capacitance sensing mode. Specially, the capacitance of the variable capacitor Ccomp is equal to the capacitance of the electrode on the first path, and so the touch can be sensed in the large panel.

The capacitance of the electrode and the capacitance of the variable capacitor Ccomp may be not accurately equal to due to process deviation of the electrode. Accordingly, the driving circuit of the present embodiment is embodied with a circuit capable of connecting selectively capacitors in parallel to the node B, to adjust the variable capacitor Ccomp in desired voltage range. Particularly, capacitors C to $2^{N-1}C$ may be formed in parallel, one terminal of each of the capacitors C to $2^{N-1}C$ may be connected to the node B through switches D<0> to D<N−1>, and the other terminal of each of the capacitors C to $2^{N-1}C$ may be connected to a ground through the switches D<0> to D<N−1>. On the other hand, since the switches connected to the one terminal and the other terminal of each of the capacitors C to $2^{N-1}C$ are simultaneously on or off, the same numerical number is used to the switches D<0> to D<N−1> connected to the one terminal and the other terminal.

Figure 8:
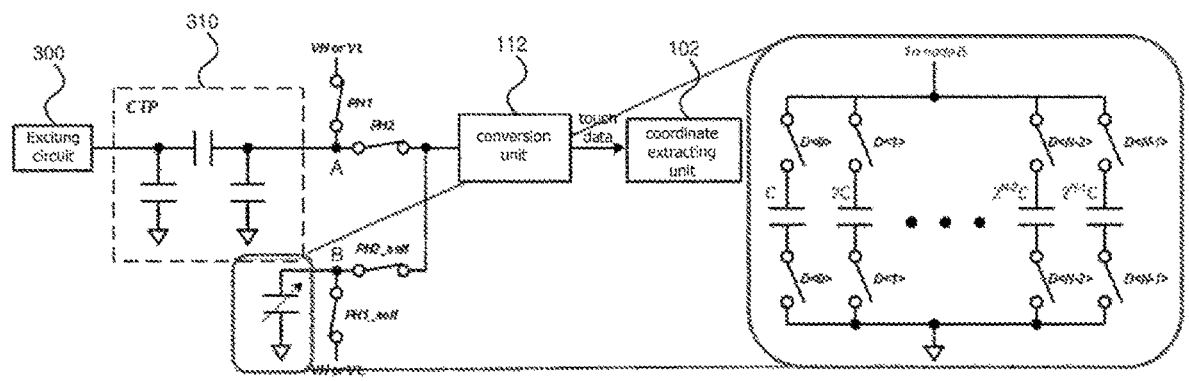

The variable capacitor Ccomp may be used for one channel as shown in FIG. 8, but may be used for multiple channels. Here, each of the channels may have the same structure as the driving circuit in FIG. 8 or similar structure to the driving circuit in FIG. 8.

Figure 9:
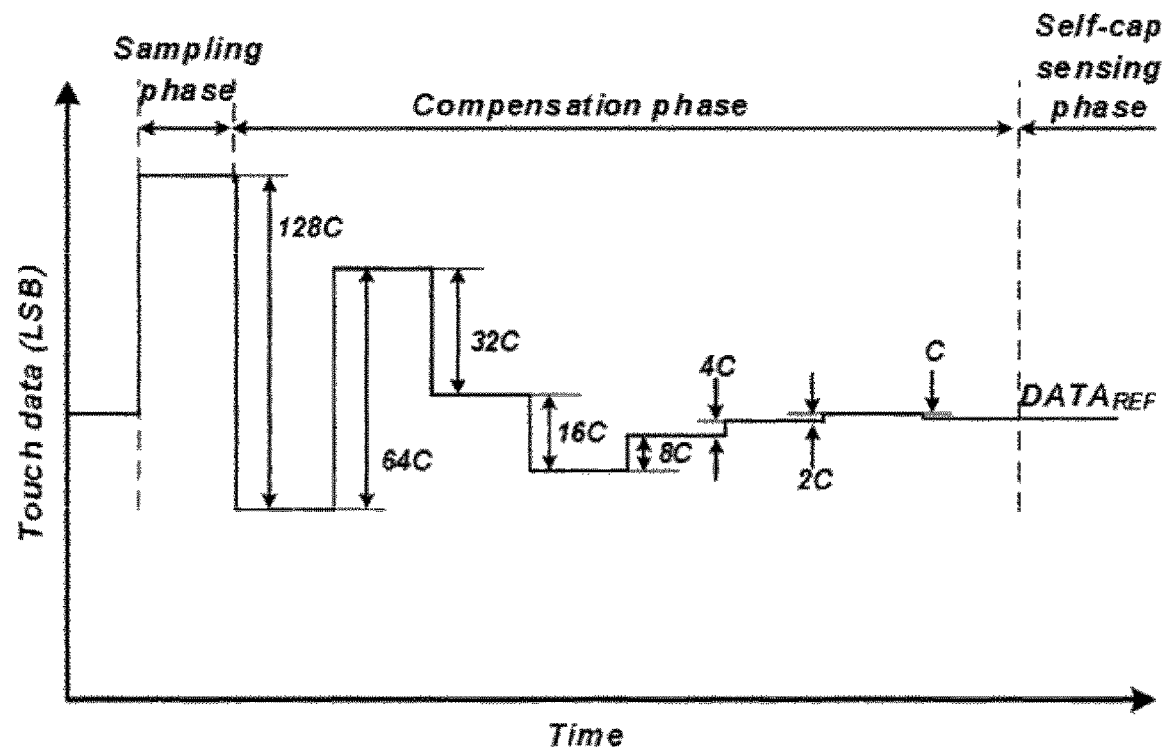

The voltages of the nodes A and B may not be converged to (VH−VL)/2 during the charge sharing interval, according to the capacitance of the variable capacitor Ccomp, which is not described above. Particularly, the voltages of the nodes A and B may not be converged to (VH−VL)/2 during the charge sharing interval if the capacitance of the variable capacitor Ccomp is very small or high. To solve the problem, the driving circuit may switch sequentially the switches D<0> to D<N−1> so that the voltages of the nodes A and B are converged to (VH−VL)/2 during the charge sharing interval. This example is shown in FIG. 9. That is, a compensation interval for performing the above operation exists before a self capacitance sensing interval.

Components in the embodiments described above can be easily understood from the perspective of processes. That is, each component can also be understood as an individual process. Likewise, processes in the embodiments described above can be easily understood from the perspective of components.

The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

What is claimed is:

1. A driving circuit for a touch panel, comprising:
   a mode selection operating unit configured to perform selectively a mutual capacitance sensing mode and a self capacitance sensing mode through a switching operation; and
   a conversion unit connected to the mode selection operating unit,
   wherein the mode selection operating unit senses change of capacitance in response to touch of the touch panel in a selected mode, and the conversion unit converts the changed capacitance to touch data,
   wherein the mode selection operating unit includes:
   a first path unit configured to sense change of the capacitance in response to the touch of the touch panel in the mutual capacitance sensing mode; and
   a second path unit configured to sense change of the capacitance in response to the touch of the touch panel in the self capacitance sensing mode, and
   wherein only the first path unit is activated while the second path unit is not activated in the mutual capacitance sensing mode, and the first path unit and the second path unit are activated in the self capacitance sensing mode.

2. The driving circuit of claim 1, wherein the mode selection operating unit includes:
   a mutual capacitance path unit configured to sense change of capacitance in response to the touch of the touch panel in the mutual capacitance sensing mode; and
   a self capacitance path unit configured to sense change of capacitance in response to the touch of the touch panel in the self capacitance sensing mode.

3. The driving circuit of claim 1, wherein
   the first path unit includes a first capacitor of which capacitance is changeable in response to the touch of the touch panel and a second capacitor having capacitance corresponding to an electrode for touch sensing, the second path unit includes a variable capacitor, and capacitance of the variable capacitor is equal to capacitance of the second capacitor.

4. The driving circuit of claim 3, wherein the first capacitor and the variable capacitor are connected in parallel based on the conversion unit,
wherein a first node connected to one terminal of the first capacitor and a second node connected to one terminal of the variable capacitor have the same voltage according to a charge sharing operation before the touch.

5. The driving circuit of claim 4, wherein the first node and the second node are connected to a power source,
wherein an interval where the first node and the second node are connected to the power source is not overlapped with an interval where the first node and the second node are connected to the conversion unit.

6. The driving circuit of claim 4, wherein the variable capacitor includes a plurality of capacitors connected in parallel to the second node through switches,
wherein capacitance of the variable capacitor is set by operating sequentially the switches.

7. A sensing circuit used in a driving circuit for a touch panel, comprising:
a first path unit configured to sense change of capacitance in response to touch of the touch panel in a mutual capacitance sensing mode; and
a second path unit configured to sense change of capacitance in response to the touch of the touch panel in a self capacitance sensing mode,
a first switch configured to connect the first path unit to a conversion unit; and
a second switch configured to connect the second path unit to the conversion unit,
wherein the mutual capacitance sensing mode and the self capacitance sensing mode operate selectively, and both of the first path unit and the second path unit are used in the mutual capacitance sensing mode or the self capacitance sensing mode, and
wherein the path units are connected in parallel based on the conversion unit, the first switch is turned on and the second switch is off in the mutual capacitance sensing mode, and the first switch and the second switch are turned on in the self capacitance sensing mode.

8. The sensing circuit of claim 7, wherein the first path unit includes a capacitor that having capacitance is changeable in response to the touch of the touch panel and a capacitor corresponding to capacitance of an electrode for touch sensing, and the second path unit includes a variable capacitor having capacitance for cancelling at least part of the capacitance of the electrode.

9. A sensing circuit used in a driving circuit for a touch panel, comprising:
a first path unit configured to include a first capacitor having capacitance that is changeable in response to touch of the touch panel and a second capacitor corresponding to an electrode for touch sensing; and
a second path unit configured to include a third capacitor,
wherein the third capacitor has capacitance for cancelling at least part of the capacitance of the second capacitor,
wherein the third capacitor is a variable capacitor, and capacitance of the third capacitor is set considering process deviation of the electrode.

10. The sensing circuit of claim 9, wherein only the first path unit is activated in a mutual capacitance sensing mode, and the first path unit and the second path unit are activated in a self capacitance sensing mode.

11. A method of sensing touch of a touch panel comprising a first path unit including a capacitor having capacitance that is changeable in response to touch of the touch panel, a second path unit including a variable capacitor, a first switch connected between the first path unit and a conversion unit and a second switch connected between the second path unit and the conversion unit, the method comprising:
charging a first node between the capacitor and the first switch and a second node between the variable capacitor and the second switch;
sharing charges of the first node and the second node so that the first node and the second node have the same voltage; and
sensing the change of the capacitance in response to the touch of the touch panel while the first node and the second node have the same voltage,
wherein an interval for the charging and an interval for the sharing are not overlapped.

12. The method of claim 11, further comprising:
adjusting the variable capacitor so that capacitance of the variable capacitor is equal to capacitance corresponding to an electrode for touch sensing.

13. The method of claim 11, wherein the first path unit is activated and the second path unit is not activated in a mutual capacitance sensing mode, and both of the first path unit and the second path unit are activated in a self capacitance sensing mode.

* * * * *